UNITED STATES PATENT OFFICE.

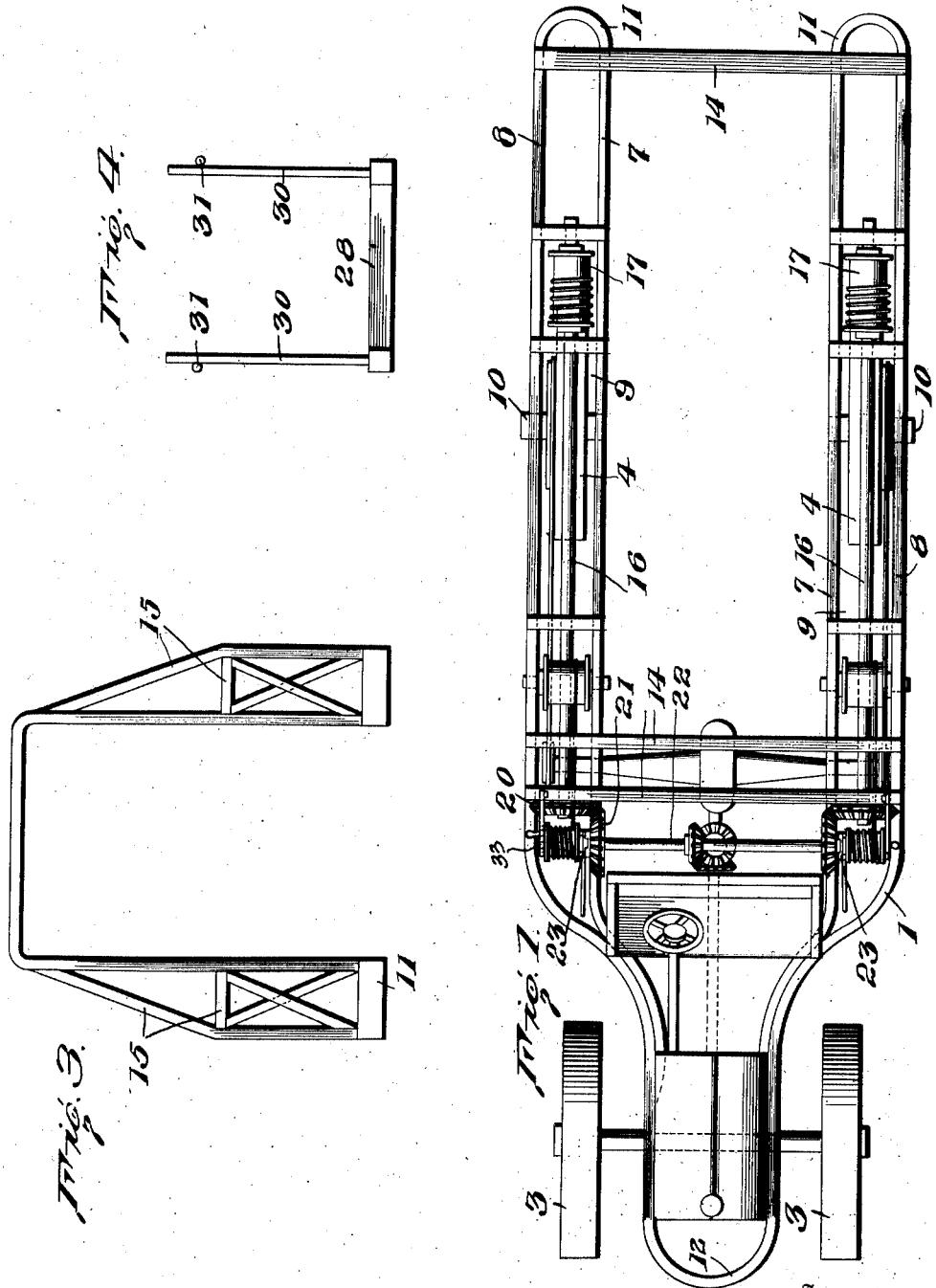

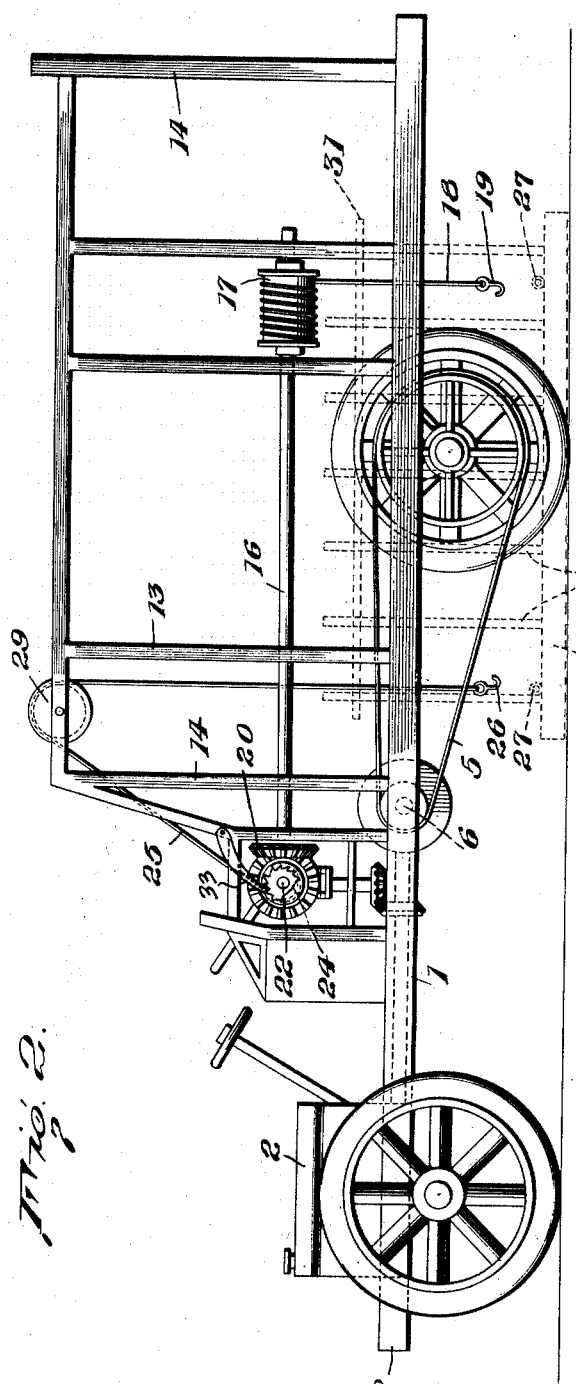

FIDELIO GUASCH, OF SAN NICOLAS, CUBA.

LOADING AND UNLOADING APPARATUS.

1,365,983.　　　　Specification of Letters Patent.　　Patented Jan. 18, 1921.

Application filed August 21, 1920. Serial No. 405,194.

*To all whom it may concern:*

Be it known that I, FIDELIO GUASCH, a citizen of the Republic of Cuba, and resident of San Nicolas, Cuba, have invented certain new and useful Improvements in Loading and Unloading Apparatus, of which the following is a specification.

This invention relates to loading and unloading apparatus; and its object, briefly stated, is the provision of an improved apparatus of the general character indicated which, while capable of operating in connection with grain, fruits, foodstuffs and the like in bulk, is especially adapted for use in taking up a load of sugar cane from the fields where it is cut, transporting it to the crushing mill and unloading it at the latter point.

According to the invention, a motor truck provided with a specially-constructed chassis is backed over a platform, which has previously been loaded with the cane or other material, and the loaded platform is then raised by means of hoisting mechanism mounted on the chassis, and is retained in such position during the subsequent travel of the truck to the mill. On reaching the mill, the hoisting mechanism is operated in such a way that the platform assumes an inclined position, thereby dumping its load at the desired point.

An embodiment of the invention is illustrated in the accompanying drawing, in which:—

Figure 1 is a plan view of the improved apparatus complete;

Fig. 2 is a side elevation thereof, showing in dotted lines the loading platform in place upon the ground;

Fig. 3 is an end view of the chassis; and

Fig. 4 is an end view of the platform.

Referring more particularly to the drawing, 1 indicates, generally, the chassis of an automobile truck; 2 the engine thereof; 3 the front wheels and 4 the rear wheels. The front wheels 3 are steered in the usual way and are constructed and mounted in the ordinary manner; and the rear wheels 4 may likewise be of conventional form and driven by connections 5 from the differential shaft 6, which, in turn, is driven from the engine.

The chassis comprises pairs of inner and outer beams 7 and 8 so arranged as to form relatively narrow wheel spaces or compartments 9 at opposite sides of the chassis; and the rear wheels 4 are disposed within these compartments and are mounted on short axles 10 operatively supported from said beams, the two axles 10 alining with each other. In the illustrated embodiment of the invention, which may be regarded for all present purposes as preferred, the rear ends of the adjacent inner and outer beams are joined by integral connecting portions 11; and the front ends of the two outer beams 8 may be similarly joined by an integral connecting portion 12, the portions 11—11 and 12 being here shown as curved, and the front ends of the inner beams 7 being fastened to the forward portions of the said outer beams. The space between the inner beams is left open, to permit the truck to be backed over the hereinafter-described loading platform.

A framework is mounted on the chassis, and comprises vertical side members 13 connected at their opposite ends by bridges 14, said sides being strengthened by bracework 15 at suitable points. Directly above each compartment 9 there is arranged a longitudinal shaft 16, journaled in bearings (not shown) provided in connection with the above-described framework, each shaft carrying at its rear end a drum 17 on which a cable 18 is wound, the free end of each cable being equipped with a hook 19. A bevel gear 20 is fixed to the front end of each shaft 16 and meshes with a similar gear 21 on the adjacent end of an elevated cross-shaft 22, which is driven from the engine through suitable connections; this shaft 22 having on each end thereof a drum 24 in clutch connection, as at 23, with the adjacent pinion 21, so that the two drums may alternatively be clutched to pinions 21 to be driven therewith, or unclutched from said pinions and held stationary by means of a pawl-and-ratchet device 33 or other suitable detent means of like character. In the first case, the four drums 17 and 24 will rotate in unison, but in the other case only the two rear drums 17 will rotate. The front drums 24 are equipped with cables 25 having terminal hooks 26; the latter, together with the hooks 19 on the rear cables 18, being engageable in eyes 27 provided on the front and rear portions of the loading platform 28, so that said platform may be raised and lowered at will by the hoisting mechanism above described. The front cables pass over elevated pulleys 29 mounted in the forward portions of the frame sides.

The platform 28 is adapted to rest on the ground during the time that it is being loaded with the cane or other material, and is provided with upright bars 30 along its side edges, said bars being connected by longitudinal rods 31. The platform is sufficiently small to enable it to readily pass through the space between the inner beams 7 of the chassis, so that it may be raised to a position above said beams.

In operation, the platform is lowered upon the ground at a point in the field where the cane is being cut, and is there loaded with the cane. The truck is then backed over the loaded platform until the latter comes immediately into the open space between the beams 7, after which the hoisting mechanism is operated to unwind the cables 25 and 18 from the drums 24 and 17. The hooks 26 and 19 on the cables are then engaged with the eyes 27 on the platform, which is thereupon raised by the action of the hoisting mechanism which in the meantime has been reversed to wind up the cables. The platform is thus brought into elevated position, and is retained in such position during the subsequent travel of the truck toward the mill. On reaching the latter, the front drums 24 are unclutched from their pinions 21 and the hoisting mechanism is again set to lower the platform, the front end of which will remain in elevated position, due to the disconnection of drums 24 which are held against backward rotation by their pawl-and-ratchet devices 33. Hence, when the hoisting mechanism starts to operate, only the rear drums 17 will be driven, with the result that the rear end of the platform will swing down and form an inclined chute, down which the cane will slide to the point where it is to be discharged. When the unloading operation has been completed, the rear end of the platform is raised until the platform once more occupies a horizontal position; after which, it is carried back to the field to be re-loaded.

I claim as my invention:

1. Apparatus of the character described, comprising a wheeled truck having a chassis which is provided with a relatively long and wide clearance space; driving mechanism for the truck; a loading and unloading platform movable vertically through said clearance space between a position upon the ground and an elevated position above the chassis; and hoisting mechanism for raising both ends of the platform simultaneously from the ground while said platform is loaded and occupies a horizontal position, and for subsequently lowering one end of the platform while maintaining the other end elevated so as to discharge the load.

2. Apparatus of the character described, comprising a wheeled truck having a chassis which is provided with a relatively long and wide clearance space; driving mechanism for the truck; a loading and unloading platform movable vertically through said clearance space between a position upon the ground and an elevated position above the chassis; and hoisting mechanism for the platform, said hoisting mechanism including front and rear drum means, cables thereon adapted to be connected to the adjacent ends of the platform, and controlling means for enabling simultaneous rotation of both front and rear drum means so as to cause bodily movement of the platform while occupying a horizontal position, or for enabling rotation of solely one drum means while maintaining the other drum means stationary so as to cause movement solely of the platform end adjacent the drum means operated.

3. Apparatus of the character described, comprising a wheeled truck having a chassis which is provided with a relatively long and wide clearance space; driving mechanism for the truck; a loading and unloading platform movable vertically through said clearance space between a position upon the ground and an elevated position above the chassis; and hoisting mechanism for the platform, said hoisting mechanism including front and rear drum means, cables thereon adapted to be connected to the adjacent ends of the platform, driving means for said drum means to enable simultaneous rotation of both drum means, and clutching means between the hoisting mechanism and the front drum means to uncouple the latter from said driving means and thereby enable only the rear drum means to be operated to lower or raise the rear end of the platform, while maintaining the front end stationary.

In testimony whereof I affix my signature.

FIDELIO GUASCH.